UNITED STATES PATENT OFFICE 2,447,619

SULFURIZED ESTERS OF OXALIC ACID

Dilworth T. Rogers, Summit, and John G. McNab, Cranford, N. J., assignors to Standard Oil Development Company, a corporation of Delaware No Drawing. Application August 21, 1946,
Serial No. 692,138.

2 Claims. (Cl. 260—125)

This invention relates to a new antioxidant and corrosion inhibitor for hydrocarbon products, particularly petroleum lubricating oils.

The new class of additives which have the property of stabilizing hydrocarbon materials against oxidation and of reducing the corrosive properties of such materials are sulfurized esters of oxalic acid. In order that the introduction of sulfur can be accomplished, the ester must contain an unsaturated aliphatic radical, and in order that the compound will have the requisite solubility in hydrocarbon oils, the ester groups should each contain at least 6 carbon atoms. The desired sulfurized compounds can be formed equally well by first sulfurizing an unsaturated alcohol and subsequently esterifying such alcohol with oxalic acid, or by sulfurizing the ester after reaction of the alcohol with the acid.

The additives so produced also have sludge dispersive properties when added to crankcase lubricants, and they have the property of improving the film strength of lubricating oils. The new additives are quite free from a tendency to stain copper and its alloys, and they have a further advantage in the fact that, should they exhibit any tendency to thermal breakdown during use the end products will be carbon monoxide and water, which are not corrosive, whereas when the usual fatty acid esters decompose, free fatty acids are formed which tend to be quite corrosive.

The new class of antioxidant additives includes not only the sulfurized ester derivatives of unsaturated alcohols, but also the corresponding derivatives of unsaturated mercaptans and similar compounds containing selenium and tellurium. Also included are sulfurized esters containing an ether linkage in the ester radical, as in products derived from the reaction of butadiene monoxide and the like with a saturated alcohol, and the esterification of such a product with oxalic acid. The new class of additives may be defined broadly by the formula—

$$\begin{array}{c} \text{COTR} \\ | \\ \text{COTR} \end{array}$$

where T is a non-metallic element of group VI of the periodic table, and R is a sulfurized radical selected from the group consisting of unsaturated aliphatic hydrocarbon radicals and unsaturated aliphatic hydrocarbon radicals containing an ether linkage, each of such radicals containing at least 6 carbon atoms.

The esterification of an unsaturated long chain alcohol, e. g., oleyl alcohol, with oxalic acid may be accomplished readily without catalysts and is preferably carried out in a solvent, such as chloroform, carbon tetrachloride, benzene, or toluene. The temperature should be kept below 130° C. to prevent the formation of formates. In the preparation of esters from unsaturated mercaptans, it is preferable to first form the sodium mercaptide and to react the latter with oxalyl chloride. As stated before, the sulfurization may be accomplished by heating the original unsaturated alcohol with sulfur, or by a similar treatment of the oxalate ester.

Examples of suitable unsaturated alcohols which may be esterified and sulfurized in accordance with the present invention are hexenol, octenol, nonenol, undecenol, oleyl alcohol, and the reaction products of butadiene monoxide with saturated alcohols. The diolefin alcohols are also suitable. The use of commercially available unsaturated alcohols, which may contain mixtures of unsaturated alcohols with or without saturated alcohols, is also contemplated.

Below are given examples of the preparation of sulfurized alcohols and esters illustrating the present invention, and results of tests applied to lubricating oils containing the same. These examples are given for illustrative purposes only, and are not to be considered as limiting the scope of the invention in any manner.

EXAMPLE 1.—PREPARATION OF SULFURIZED OLEYL ALCOHOL 500 grams of commercial oleyl alcohol and 58.5 grams of sulfur were heated for two hours at 335° F., 2.8 grams of a commercial vulcanization accelerator (reported to be pentamethylene diamine dithiocarbamate) and 2.8 grams of zinc oxide being added to accelerate the sulfurization. The reaction mixture was allowed to cool and was then filtered through "Hyflo" filter aid. The product was a brown viscous liquid at room temperature, solidifying at about 15° C.

EXAMPLE 2.—PREPARATION OF THE OXALATE ESTER OF SULFURIZED OLEYL ALCOHOL

A solution of 350 grams of sulfurized oleyl alcohol, prepared as in Example 1, in 250 cc. of benzene and 250 cc. of xylene was placed in a round bottom flask and 63 grams of oxalic acid ($C_2H_2O_4.2H_2O$) added. The mixture was heated at refluxing temperature for several hours during which time 36 cc. of water was removed through a trap in the reflux condenser. The reaction mixture was then filtered and the filtrate heated in vacuo to remove the solvent. The ester was obtained as a dark viscous liquid, soluble in mineral oil. It contained 9.0% sulfur and had an acid number of 71.7 and a saponification number of 178.2.

EXAMPLE 3.—PREPARATION OF OLEYL OXALATE 700 grams of commercial oleyl alcohol, 150 cc. of xylene, 250 cc. of benzene and 135 grams of oxalic acid were placed in a reaction flask equipped with a reflux condenser which had been fitted with a trap for removal of water from the reflux stream. The mixture was heated at reflux temperature for 3 to 4 hours during which time 79 cc. of water was removed through the trap. Solvents were removed by evaporation, leaving the oleyl oxalate ester as a semi-solid residue. It had an acid number of 69.25 and a saponification number of 147.55 and was soluble in mineral lubricating oils.

EXAMPLE 4.—SULFURIZATION OF OLEYL OXALATE 500 grams of oleyl oxalate from Example 3 and 50 grams of sulfur were heated at 335° F. for two hours. There was no evolution of hydrogen sulfide. After filtration, the product obtained was a dark viscous liquid containing 9.86% sulfur.

EXAMPLE 5.—BEARING CORROSION TESTS

Blends of a lubricating oil base consisting of a refined solvent extracted paraffinic type mineral lubricating oil of SAE 20 grade with 1% each of the products of Examples 2, 3 and 4, as well as a sample of the unblended oil base, were submitted to a bearing corrosion test to determine the effect of the additives in inhibiting the corrosion of copper-lead bearings. The test was conducted as follows: 500 cc. of the oil to be tested was placed in a glass oxidation tube (13" long and 2⅝" diameter) fitted at the bottom with a ¼" bore air inlet tube perforated to facilitate air distribution. The oxidation tube was then immersed in a heated bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the oil and rotated at 600 R. P. M., thus providing sufficient agitation of the sample during the test. Air was then blown through the oil at the rate of 2 cu. ft. per hour. To increase the severity of the test, the bearings were washed and weighed at the end of each four hour period and then polished and reweighed before continuing for another period. The results given below in Table I show the cumulative weight loss at the end of each four hour period.

Table I

| Oil | Cumulative Bearing Weight Loss (mg./25 sq. cm.) | | | | | | |
| --- | --- | --- | --- | --- | --- | --- | --- |
| | 4 hrs. | 8 hrs. | 12 hrs. | 16 hrs. | 20 hrs. | 24 hrs. | 28 hrs. |
| Base Oil | 5 | 181 | | | | | |
| Base Oil+1% Oleyl Oxalate (Ex. 3) | 4 | 180 | | | | | |
| Base Oil+1% Oxalate of Sulfurized Oleyl Alcohol (Ex. 2) | 0 | 0 | 3 | 8 | 16 | 31 | 52 |
| Base Oil+1% Sulfurized Oleyl Oxalate (Ex.4) | 0 | 0 | 0 | 4 | 12 | 35 | 67 |

The above results show clearly the corrosion inhibiting properties of the additives of the present invention, also that the sulfurization step is equally effective whether carried out before or before or after esterification of the alcohol.

EXAMPLE 6.—60-HOUR CFR ENGINE TESTS

Engine tests of a lubricating oil base consisting of a solvent extracted Mid-Continent paraffinic oil of 52 seconds Saybolt viscosity at 210° F., to which had been added sufficient polybutene to produce a finished oil of 72 seconds Saybolt viscosity at 210° F. and 120 viscosity index, and of such base oil blended with sulfurized oleyl alcohol and sulfurized oleyl oxalate (product of Example 2) in the proportions shown in the table below were tested in a CFR test engine for periods of 60 hours under the following conditions: 9.3 brake horsepower output, 1800 R. P. M., 200° F. crankcase oil temperature, 200° F. cooling jacket temperature. After each engine test was completed, the engine parts were examined and given demerit ratings based on their condition, particular attention being given to the ring zone condition. The individual ratings were weighted according to their relative importance and an overall demerit rating calculated from them. On this basis a lower demerit rating indicated a better engine condition, and hence a better performance of the oil. The results obtained are presented in the following table:

Table II

| Oil | Engine Demerits | | | | |
| --- | --- | --- | --- | --- | --- |
| | Overall | Ring Zone | Piston Skirt | Sludge | Oil Filter |
| Base Oil | 2.55 | 3.37 | 2.00 | 2.25 | 4.50 |
| Base Oil+0.77% Sulfurized Oleyl Alcohol (Ex. 1) | 2.84 | 3.43 | 3.00 | 2.33 | 4.50 |
| Base Oil+0.83% Sulfurized Oleyl Oxalate (Ex. 2) | 1.21 | 2.05 | 0.50 | 0.75 | 1.50 |

The above results show the superiority of the sulfurized oleyl oxalate as compared with the sulfurized oleyl alcohol.

The products of the present invention may be employed not only as the sole additives in hydrocarbon lubricating oils but also in conjunction with such detergent type additives as metal sulfonates, metal soaps, metal phenates, metal alcoholates, metal phenol sulfonates, metal alkyl phenol sulfides, metal organo phosphates, thiophosphates, phosphites and thiophosphites, metalsalicylates, metal xanthates and thioxanthates, metal thiocarbamates, reaction products of metal phenates or metal phenol sulfides with sulfur, reaction products of metal phenates or metal phenol sulfides with phosphorus sulfides, and the like. Thus, the new additives of this invention may be used in lubricating oils containing such addition agents as nickel oleate, barium octadecylate, calcium phenyl stearate, zinc diisopropyl salicylate, aluminum naphthenate, calcium cetyl phosphate, barium di-tert.-amyl phenol sulfide, calcium petroleum sulfonate, zinc methyl cyclohexyl thiophosphate, calcium dichlorostearate, etc.

The lubricating oil base stocks used in the compositions of this invention may be straight mineral lubricating oils, or distillates derived from paraffinic, naphthenic, asphaltic, or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloroethyl ether, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances, cracking coal tar fractions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additives present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed Diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in gasoline engine service, oils of higher viscosity index are often required, for example up to 75 or 100, or even higher, viscosity index.

In addition to the materials to be added according to the present invention, other agents may also be used such as dyes, pour depressors, heat thickened fatty oils, sulfurized fatty oils, organo-metallic compounds, metallic or other soaps, sludge dispersers, antioxidants, thickeners, viscosity index improvers, oiliness agents, defoaming or antifoaming agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like may also be employed.

Assisting agents which are particularly desirable as plasticizers and defoaming agents are the higher alcohols having eight or more carbon atoms and preferably 12 to 20 carbon atoms.

The alcohols may be saturated straight or branched chain aliphatic alcohols such as octyl alcohol ($C_8H_{17}OH$), lauryl alcohol ($C_{12}H_{25}OH$), cetyl alcohol ($C_{16}H_{33}OH$), stearyl alcohol, sometimes referred to as octadecyl alcohol ($C_{18}H_{37}OH$), and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes the wool fat, sperm oil or other natural products rich in alcohols may be used per se. Products prepared synthetically by chemical processes may also be used, such as alcohols prepared by the oxidation of petroleum hydrocarbons, e. g., paraffin wax, petrolatum, etc.

The antioxidant additives of the present invention may be employed not only in mineral lubricating oils, but also in hydrocarbon products generally, where improved resistance to oxidation is desired. Thus, the products may be added to motor fuels, Diesel fuels, kerosene, hydrocarbon polymers, natural and synthetic rubbers, etc.

The present invention is not to be considered as limited by any of the examples described herein, which are given by way of illustration only, but is to be limited solely by the terms of the appended claims.

We claim:

1. As a new composition of matter a compound of the formula—

where R is a sulfurized unsaturated aliphatic hydrocarbon radical containing at least 6 carbon atoms.

2. As a new composition of matter, sulfurized oleyl oxalate.

DILWORTH T. ROGERS.
JOHN G. McNAB.

REFERENCES CITED

The following references are of record in the file of this patent:

UNITED STATES PATENTS

| Number | Name | Date |
|---|---|---|
| 2,169,998 | Guenther et al. | Aug. 22, 1939 |
| 2,179,061 | Smith | Nov. 7, 1939 |
| 2,179,065 | Smith | Nov. 7, 1939 |
| 2,186,646 | Lincoln et al. | Jan. 9, 1940 |
| 2,220,843 | Johnson | Nov. 5, 1940 |
| 2,398,479 | Vaughan et al. | Apr. 16, 1946 |

OTHER REFERENCES

Bhatnagar et al.: Chem. Abstracts, 40, page 2968, May 20, 1946.